(12) United States Patent
Sharma et al.

(10) Patent No.: US 8,977,599 B2
(45) Date of Patent: Mar. 10, 2015

(54) METHOD AND SYSTEM FOR TESTING CLIENT-SERVER APPLICATIONS

(75) Inventors: Nityanand Sharma, Tampa, FL (US); Nitesh Malviya, Tampa, FL (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 593 days.

(21) Appl. No.: 12/944,198

(22) Filed: Nov. 11, 2010

(65) Prior Publication Data
US 2012/0124074 A1 May 17, 2012

(51) Int. Cl.
*G06F 17/30* (2006.01)
*G06F 11/36* (2006.01)

(52) U.S. Cl.
CPC .................... *G06F 11/3672* (2013.01)
USPC .......................................... 707/687; 707/790

(58) Field of Classification Search
None
See application file for complete search history.

(56) References Cited

U.S. PATENT DOCUMENTS

| 2002/0198883 A1* | 12/2002 | Nishizawa et al. ............. 707/10 |
| 2006/0010427 A1* | 1/2006 | Hoffman ........................ 717/124 |
| 2008/0184206 A1* | 7/2008 | Vikutan .......................... 717/127 |
| 2012/0117095 A1* | 5/2012 | Chavvakula et al. .......... 707/758 |

* cited by examiner

*Primary Examiner* — Syed Hasan

(57) ABSTRACT

A database-driven testing method and system for testing client-server applications are described. The system first receives a command to test a module on a server and identifies in a database a message list corresponding to the module. The message list indicates at least a request message and an expected response message supported by the module to be tested. The system then retrieves from the database a plurality of parameters for the messages in the message list and constructs the request message based on the parameters. The system then transmits the request message to the module on the server, receives a server response message from the server in response to the request message, and compares the server response message with the expected response message.

14 Claims, 5 Drawing Sheets

METHOD AND SYSTEM FOR TESTING CLIENT-SERVER APPLICATIONS

BACKGROUND INFORMATION

The complexity of communication networks has increased rapidly in the past two decades due to the advance in broadband service, wireless technologies, etc. The progression from fixed desktop applications to mobile office with handheld devices requires a far more robust and flexible network, with richer content, than simple circuit switching technology permits. To be useful and profitable, the content provided by these connections needs to be timely, topical and customized to the needs of the users. Customers will demand always-on or always-available connections.

Client-server application provides a powerful platform for delivering content services over communication networks. Client-server systems provide effective and efficient information distribution and gathering on various scales. They allow rapid deployment of information systems in a variety of end-user environments.

Existing techniques for testing client-server applications are insufficient for the widely-distributed, heavily-loaded, mission-critical networks toward which communication networks are evolving. It becomes impractical for testing personnel to laboriously search through equipment racks for test ports, while network downtime continues to mount. Existing testing applications that are built into the client-server systems must be updated or recompiled every time the systems are modified or changed. These applications are platform-dependent and therefore cannot be migrated to a different system. Customer expectations of higher quality services mandate a focus on testing and service assurance, as well as cost-effective methods to discover potential server problems before they cause any service outages.

DETAILED DESCRIPTION

Reference will now be made in detail to exemplary embodiments, examples of which are illustrated in the accompanying drawings. The following description refers to the accompanying drawings in which the same numbers in different drawings represent similar elements unless otherwise represented. The implementations set forth in the following description of exemplary embodiments consistent with the present invention do not represent all implementations consistent with the claimed invention. Instead, they are merely examples of systems and methods consistent with aspects related to the invention as recited in the appended claims.

Various exemplary embodiments described herein provide methods and systems for performing and controlling tests of a client-server application independently from the client-server system. In general, the system provides a database-driven utility and a design to test multiple modules within the client-server application. This design avoids dependency of the testing system on the specific codes and compilations used in the client-server application.

According to one embodiment, the system receives a command to test a module on a server. The system then identifies in a database a message list corresponding to the module. The message list indicates at least a request message and an expected response message in response to the request message for that module. The system retrieves from the database a plurality of parameters for the messages in the message list and constructs the request message based on the parameters. The system then transmits the request message to the module on the server. Upon receiving a server response message from the server in response to the request message, the system compares the response message with the expected response message.

Figure 1:
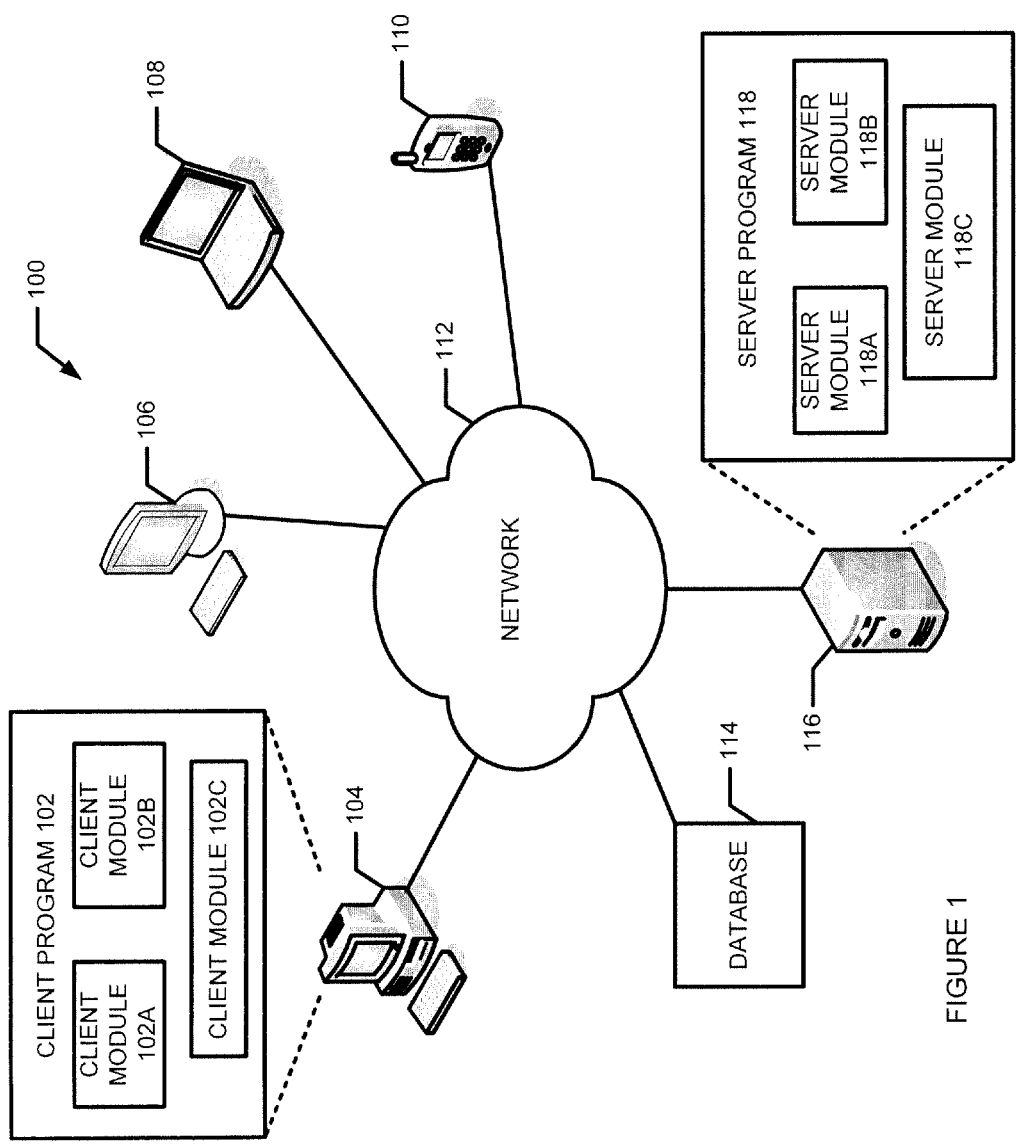
FIG. 1 illustrates a schematic diagram of an exemplary system environment for implementing exemplary embodiments.

FIG. 1 is a schematic diagram of a testing system in accordance with various embodiments described herein, and an exemplary communication network environment, within which the system operates. A telecommunications network 100 may include a network 112, which interconnects a number of computer systems including a server 116; one or more client terminals 104; one or more testing terminals 106, 108, and 110; and a database 114.

Network 112 may be a shared, public, or private network encompassing a wide or local area, including an extranet, an Intranet, the Internet, a local area network (LAN), wide area network (WAN), the public switched telephone network (PSTN), integrated services digital network (ISDN), radio links, wireless telephone and/or data network, and any other form of wired or wireless communication networks. Network 112 may be compatible with any type of communication protocol used by the components of the system environment to exchange information, such as Ethernet, ATM, SONET, Transmission Control/Internet Protocol (TCP/IP), Hypertext Transfer Protocol (HTTP), Wireless Application Protocol (WAP), the various wireless communication protocols (e.g., GSM, CDMA, EV-DO), or a peer-to-peer protocol. The network provider may be, for instance, an Internet Service Provider (ISP), a wired and/or wireless telephone service provider, a cable television provider, a satellite television provider, a WAN operator, a LAN operator, or an operator of a direct-link/person-to-person network.

In general, the server 116 has a server program 118 for providing various server functions, such as video streaming, file sharing, website hosting, online banking, etc. The server program 118 may include a number of server modules such as modules 118A, 118B, and 118C. Depending on the particular application of the client-server system, the server modules are designed to provide specific functions. For example, when the server 116 is associated with a telephone service provider, the server module 118A may take the form of a telephone number server module, the server module 118B may take the form of an address server module, and the server module 118C may take the form of a switch server module.

The client terminal 104 may include a client program 102, which in turn includes a number of client modules, such as modules 102A, 102B, and 102C. These modules corresponds to those server modules in the server program 118.

During the operation of the client-server application, the client modules in the client program 102 may transmit request messages to the corresponding server modules in the server program 118. Upon receiving requests from the client program 102, the server modules may provide responses to the requests, which are then transmitted to the client program 102. The client program 102 and the server programs 118 may identify or recognize each other in accordance with various identification mechanisms such as network identifiers or port numbers.

The testing terminals 106, 108, and 110 may be implemented on a variety of computer types such as a desktop (106), a laptop (108), or a handheld device (110). The terminals 106, 108, and 110 may use aspects of TCP/IP including the hypertext transfer protocol ("HTTP"), the user datagram protocol ("UDP"), the file transfer protocol ("FTP"), the hypertext markup language ("HTML"), and the extensible markup language ("XML"). The following description uses the desktop device 106 as an example. However, it would be appreciated that systems 106, 108, and 110 are interchangeable and that techniques described below can be readily adapted to any one of these systems. In general, the testing functions provided by system 106 are external to the client program 102 and the server program 118. Any changes to the client-server system such as software/hardware upgrades or modification do not require modification or recompilation of the program codes on the testing system.

Although the testing terminals 106, 108, and 110 are shown directly connected to the network 112, any number of intervening elements, such as a LAN, a WLAN, a WAN, a Private Branch Exchange, etc., may be interposed between the terminals 106, 108, and 110 and the network 112.

The database 114 stores information and parameters of the messages supported by the client programs 102 and the server programs 118 as described above. Based on the database 114, the testing system, such as system 106, provides a database driven testing technique designed to test the functions of the server program 118 from outside the client-server system. As shown in FIG. 1, the database 114 can be made available to the testing systems 106, 108, and 110 through the network 112. Alternatively, the database 114 can be integrated into the testing system 106, 108, or 110.

The information and parameters of the client-server messages are stored in a plurality of tables within the database 114, including a message list table (Table I), a request message table (Table II), and a response message table (Table III). The message list table (Table I) includes fields such as Message ID, Message Name (e.g., Request Message or Response Message), Module Name associated with the messages, Dictionary of the messages, and the Server hosting the server program 118. The request message table (Table II) and the response message table (Table III) include fields such as Message ID, Parameter Name, and Parameter Value.

Depending on the specific functions provided by the server program 118, the fields in Tables I, II, and II can take various values. For example, when the server 116 is associated with a telephone server provider and is designed to manage user profiles and control telephone switching, Table I may include a list of the telephone number module, the address module, and the switch module. For each of these modules, Table I may further include a list of supported messages (e.g., Request Messages and Response Messages). For each Request Message in Table I, Table II may include the Message ID along with the Parameter Name, such as "Address" or "Telephone Number," and the Parameter Value, which is to be filled in by the server program 118 in the Response Message. For each Response Message, Table III may include the message ID along with the Parameter Name, such as "Address" or "Telephone Number," and the expected Parameter Value, such as "(202) 222-0000" or "100 East Wilson Street, Chicago, Ill. 60604."

TABLE I

Message List Table

FIELDS

MESSAGE ID
MESSAGE NAME
MODULE NAME
DICTIONARY
SERVER

TABLE II

Request Message Table

FIELDS

MESSAGE ID
PARAMETER NAME
PARAMETER VALUE

TABLE III

Response Message Table

FIELD

MESSAGE ID
PARAMETER NAME
PARAMETER VALUE

In testing the server program 118, the testing system 106 first receives a testing command from a user, which specifies one or more server modules to be tested on the server program 118. For each server module, the testing system 106 then searches the message list table (Table I) in the database 114 for a list of messages corresponding to the module. This list of message includes request messages as well as response messages. For each message in the message list table, the testing system 106 then retrieves the parameters from the request message table (Table II) and the response message table (Table III). The testing system then generates a copy of the request messages based on the parameters retrieved from Table II. On the other hand, the testing system generates a copy of the expected response messages based on the parameters retrieved from Table III. The testing system 106 then transmits the request messages to each server module as defined in the testing command. After the server program 118 processes the request messages, it then returns response messages to the testing system 106. Upon receiving the response messages, the testing system 106 then compares the response messages with the expected response messages and documenting the testing results.

Figure 2:
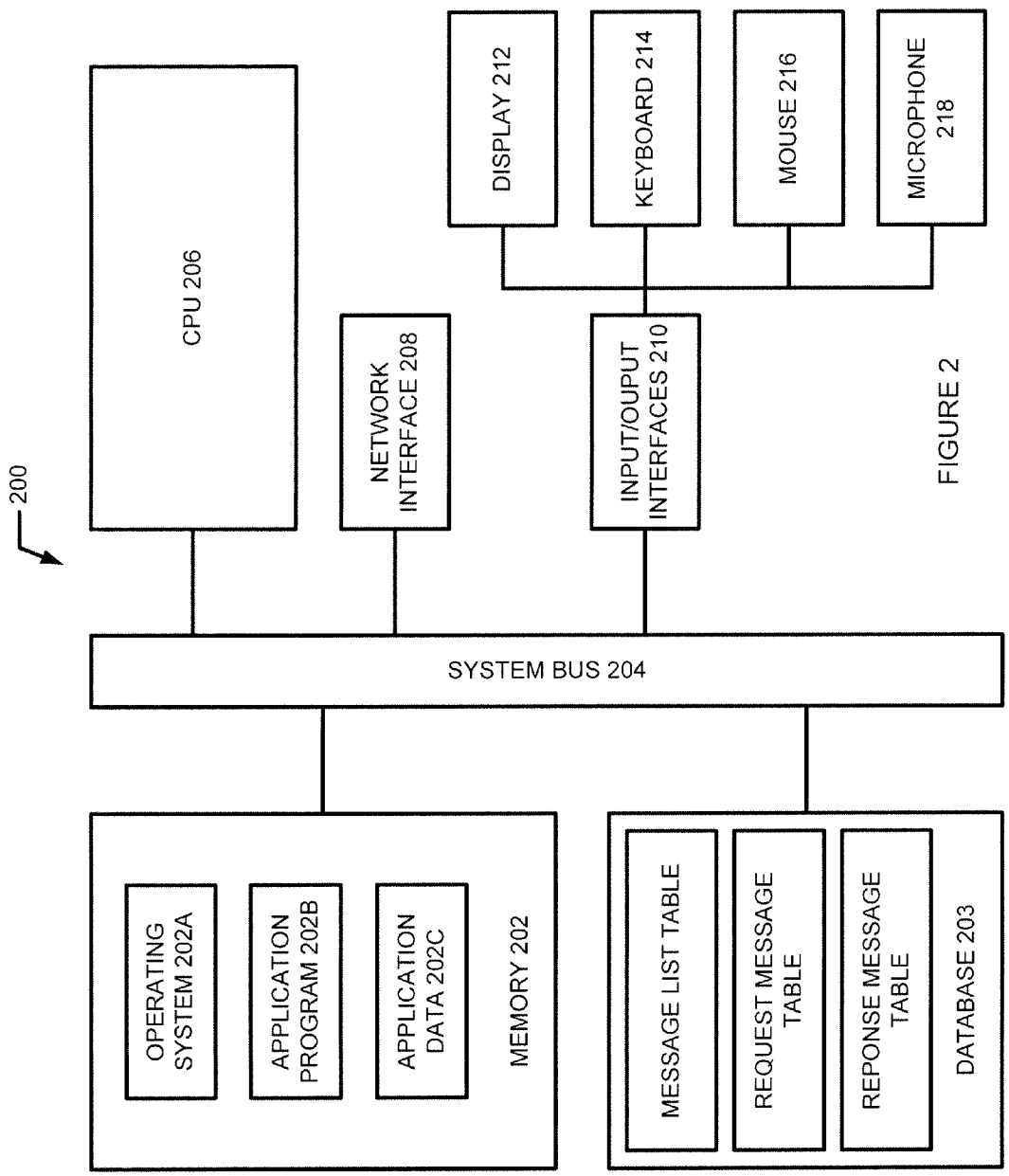
FIG. 2 illustrates a block diagram of an exemplary testing system, consistent with an exemplary embodiment.

FIG. 2 is a block diagram exemplifying one embodiment 200 of testing terminals 106, 108, and 110. The exemplary testing terminal 200 illustrated in FIG. 2 may include a central processing unit 206; a network interface 208; input/output interfaces 210; a memory unit 202; and a system bus 204 connecting the components. The CPU 206 may include one or more processing devices that execute computer instructions and store data in one or more memory devices such as the memory unit 202.

The input/output interfaces 210 provide connections between the CPU 206 and input or output devices. Input devices may include, for example, a keyboard 214, a microphone 218, and a mouse 216. Other types of input devices may also be implemented consistent with the principles of the present invention. Output device 230 may include, for example, a display 212, a printer, and a speaker. Other types of output devices may also be implemented consistent with the principles of the present invention.

The network interface 208 may include, for example, a wired modem, a wireless modem, an Ethernet adaptor, an Wi-Fi interface, or any other network adaptor as known in the art. In general, the network interface 208 provides network connection with the network 112 and allows the testing terminal 106 to exchange information with other entities in the network 112.

The CPU 206 may be any controller such as an off-the-shelf microprocessor (e.g., INTEL PENTIUM) or an application-specific integrated circuit ("ASIC") specifically adapted for the testing terminal 200. The memory unit 202 may be one or more memory devices that store data 202C and computer instructions, such as operating system 202A and application 202B. When executed by the CPU 206, the instructions cause the terminal 200 to perform the methods described herein. The memory unit 202 may be embodied with a variety of components or subsystems, including a random access memory ("RAM") and a read-only memory ("ROM").

The configuration or relationship of components illustrated in FIGS. 1 and 2 is exemplary. For example, the input and output devices, such as the display 212, the keyboard 214, and the mouse 216 may be a plurality of independent devices within separate housings detachably connected to a generic controller, such as a personal computer or set-top box. In other implementations, the CPU 206 and the input and output devices may be integrated within a single housing such as a mobile telephone. Different configurations of components may be selected based on the requirements of a particular implementation of a user terminal. In general, factors considered in making the selection include, but are not limited to, cost, size, speed, form factor, capacity, portability, power consumption and reliability.

In a further embodiment, a database 203 may be integrated in the testing terminal 200. Similar to the database 114, the database 203 may store the message list table, the request message table, and the response message table as described above. In this embodiment, when performing the tests, the testing terminal 200 may search the database 203, which resides locally, to determine the message parameters supported by server program 118.

Figure 3:
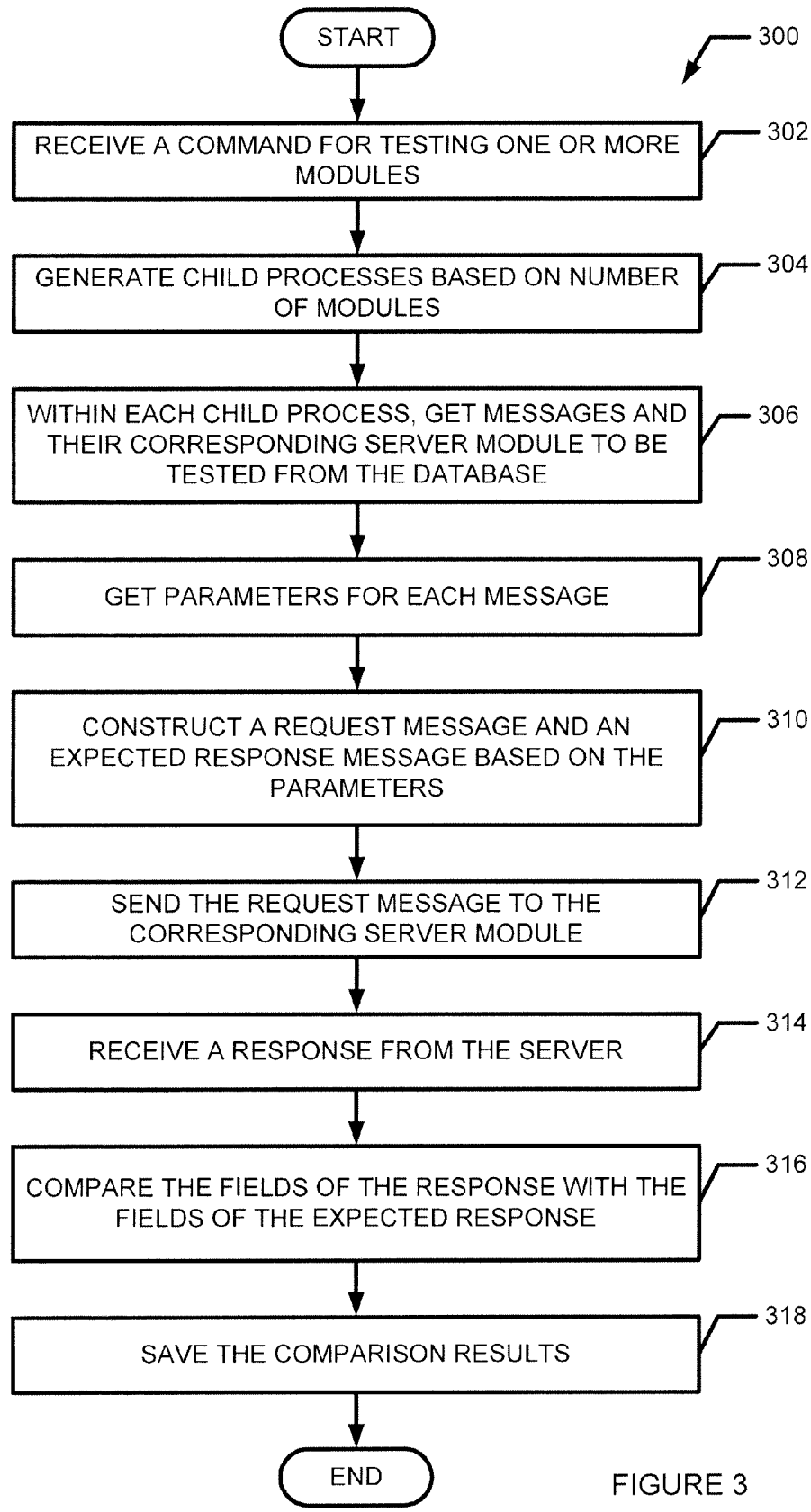
FIG. 3 illustrates an exemplary flow diagram of a testing process, consistent with an example embodiment.

FIG. 3 contains a sequence diagram exemplifying the interactions between the testing terminal 200 and the server program 118 and methods described herein. At step 302, the testing terminal 200 receives, through a parent process, a user command for testing one or more modules. The command may take the following forms:
    IntegratedTest<module 1>,
or
    IntegratedTest<module 1>, <module 2>, <module 3>, . . . ,
where "module 1," "module 2," and "module 3" identify the server modules to be tested. When a command of the latter form is provided to the testing terminal 200, more than one server module can be tested at the same time.

At step 304, based on the number of modules specified in the command, the testing terminal 200 generates a child process for each module to be tested. At step 306, within each child process, the testing terminal 200 then determines a list of messages supported by the particular module and the corresponding module name. This may be done by searching the message list table (Table I) in the external database 114 or the internal database 203. At step 308, for each message, the testing terminal 200 then retrieves the message parameters from corresponding message tables, such as the request message table (Table II) and the response message table (Table III).

At step 310, the testing terminal 200 then constructs a request message and an expected response message based on the parameters obtained from the tables. At step 312, the testing terminal 200 sends the request message to the corresponding server module on the server program 118. The server module then processes the request message and returns a response message to the testing terminal 200. Upon receiving the response message from the server program 118 at step 314, the testing terminal 200 then compares the received response message with the expected response message at step 316. The comparison includes matching the corresponding fields, for example, the Message ID, the Parameter Name, and the Parameters Value in the messages and detecting any discrepancies. At step 318, the testing terminal 200 then stores the comparison results in a database or a document for later use.

Figure 4A:
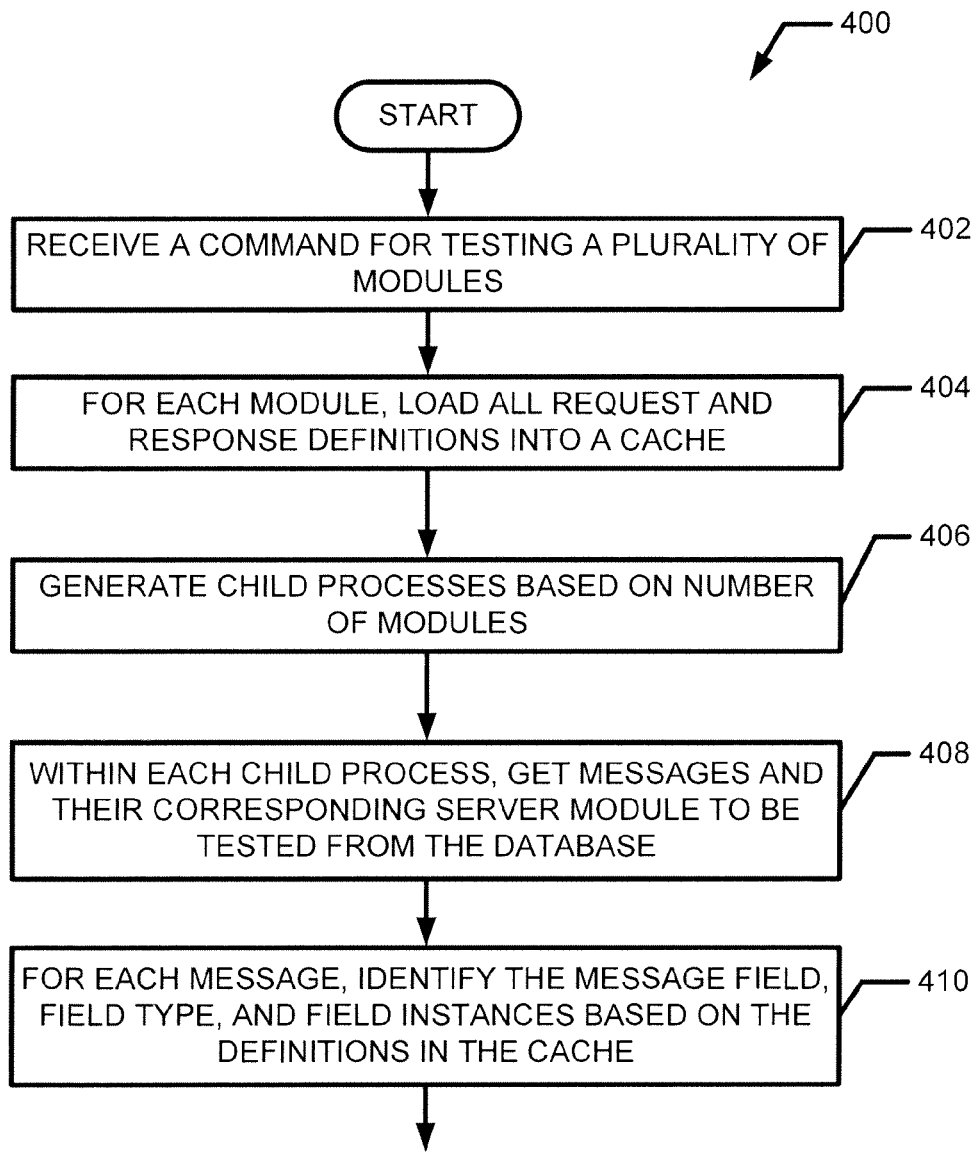
FIGS. 4A and 4B illustrate an exemplary flow diagram of a testing process, consistent with another exemplary embodiment.
Figure 4B:
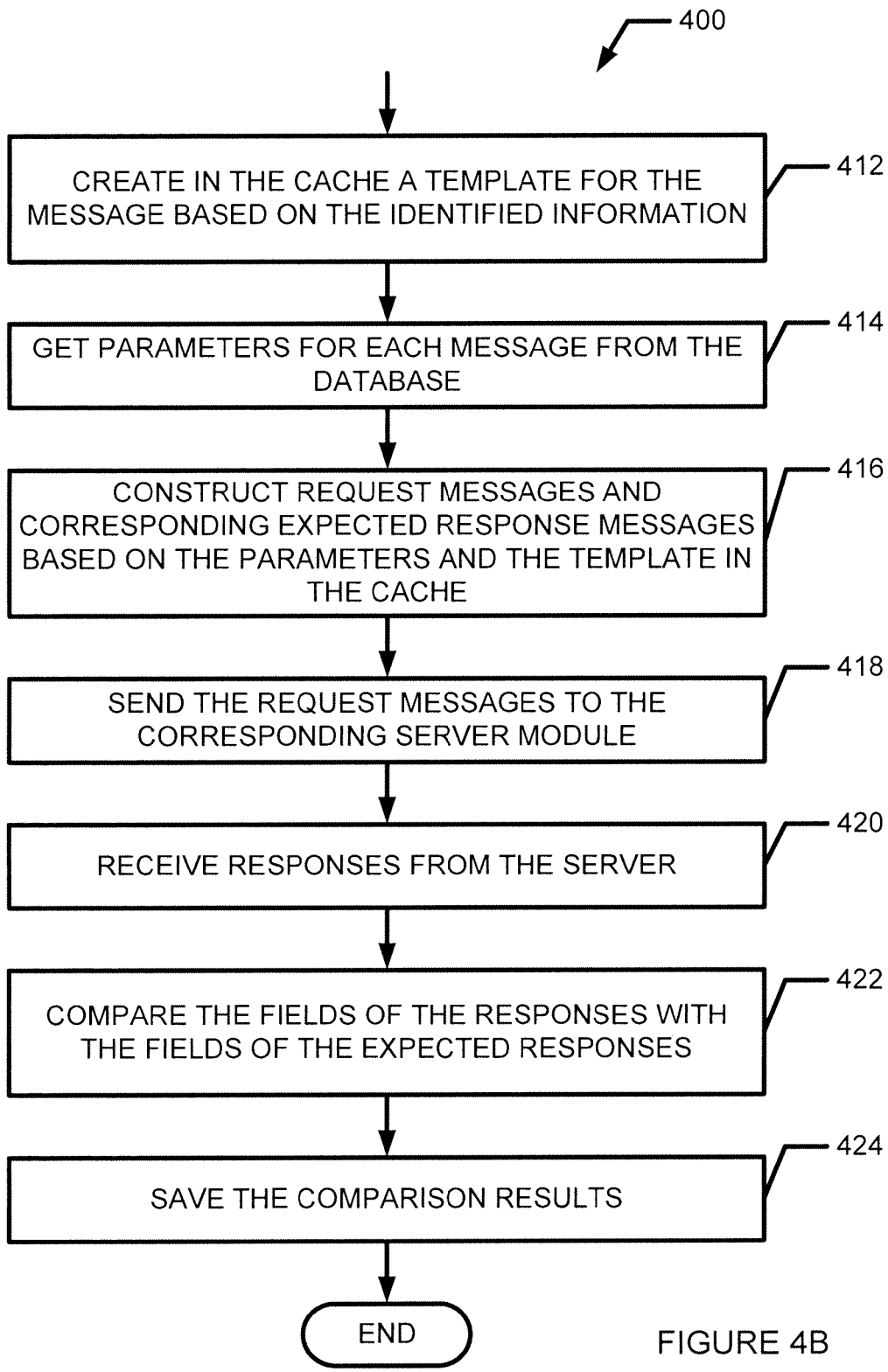

FIGS. 4A and 4B contain a sequence diagram exemplifying another embodiment of the testing methods described herein. According to this embodiment, the testing terminal 200 first loads a definition and creates a template for each message before creating an instance of the message. Specifically, at step 402, the testing terminal 200 receives a user command through a parent process for testing one or more modules. At step 404, the testing terminal loads the definitions of all request messages and response messages into a cache, which may be part of the CPU 206. These definitions of messages may be pre-stored in the memory unit 202, the internal database 203, or the external database 114.

At step 406, the testing terminal 200 generates a child process for each module to be tested. At step 408, within each child process, the testing terminal 200 then determines a list of messages supported by the particular module and the corresponding module name. This may be done by searching the message list table (Table I) in the external database 114 or the internal database 203.

At step 408, for each message, the testing terminal 200 then identifies the definition of the message in the cache. The definition specifies the message field, the field type, and the field instances. At step 412, the testing terminal 200 creates templates in the cache for the messages based on the definitions.

At step 414, the testing terminal retrieves the message parameters for each message from corresponding message table, such as the request message table (Table II) and the response message table (Table III). At step 416, the testing terminal generates the request messages and their corresponding response messages based on the retrieved parameters and the template in the cache.

At step 418, the testing terminal 200 sends the request messages to the corresponding server module in server program 118. The server module then processes the request messages and return response messages to the testing terminal 200. Upon receiving the responses from the server program 118 at step 420, the testing terminal 200 then compares corresponding fields of the received responses the expected responses and detects any discrepancies at step 422. At step 424, the testing terminal 200 stores the comparison results in a database or a document for later use.

Additionally, the database 114 or 203 in the system 100 can be updated to reflect changes to the client-server application. For example, if the client-server application is upgraded and the messages supported by the application are changed, the database entries can be modified accordingly. Because updating the databases 114 and 203 does not generally affects the software/hardware configurations of the testing systems 106, 108, and 110, system 100 can be easily adapted to a variety of client-server applications.

In the preceding specification, specific exemplary embodiments have been described with reference to specific implementations thereof. It will, however, be evident that various modifications and changes may be made thereunto, and additional embodiments may be implemented, without departing from the broader spirit and scope of the invention as set forth in the claims that follow. The specification and drawings are accordingly to be regarded in an illustrative rather than restrictive sense.

What is claimed is:

1. A method for testing, comprising:
receiving a command to test a plurality of modules residing on a server, the command including identifications of the modules;
identifying in a database one or more message lists corresponding to the modules, the one or more message lists defining, for the respective modules, at least a request message and an expected response message corresponding to the request message;
retrieving, for the respective modules from the database, definitions of the request message and the expected response message and a plurality of parameters for the request message and the expected response message;
constructing copies of the request message and the expected response message for the respective modules based on the definitions and the parameters;
generating child processes for the respective modules to be tested;
within the child process for each respective module, performing the following steps:
transmitting the constructed copy of the request message to the respective module;
receiving a server response message from the server in response to transmitting the copy of the request message to the respective module; and
comparing, for the respective module, the server response message with the constructed copy of the expected response message.

2. The method of claim 1, wherein identifying a message list further comprises:
retrieving from the database module names associated with the respective modules; and
retrieving from the database the one or more message lists corresponding to the modules based on the corresponding module names, the one or more message lists including a message identifier and a message name associated with each message.

3. The method of claim 1, further comprising:
creating templates for the request message and the expected response message in accordance with the definitions.

4. The method of claim 3, wherein the definitions define a message identification field, one or more parameter name fields, and one or more parameter value fields associated with the parameter name fields.

5. The method of claim 3, further comprising constructing copies of the request message and the expected response message based, additionally, on the templates.

6. The method of claim 1, wherein the parameters include a parameter name and a parameter value.

7. The method of claim 1, wherein comparing the server response message with the constructed copy of the expected response message further comprises:
matching parameters of the server response message and the constructed copy of the parameters of the expected response message; and
adding a comparison result to a report.

8. A non-transitory computer-readable storage medium including instructions which, when executed by a processor, cause the processor to:
receive a command to test a plurality of modules residing on a server, the command including identifications of the modules;
identify in a database one or more message lists corresponding to the modules, the one or more message lists defining, for the respective modules, at least a request message and an expected response message corresponding to the request message;
retrieve, for the respective modules from the database, definitions of the request message and the expected response message and a plurality of parameters for the request message and the expected response message;
construct copies of the request message and the expected response message for the respective modules based on the definitions and the parameters; and
generate child processes for the respective modules to be tested;
wherein within the child process for each respective module, the instructions cause the processor to:
transmit the constructed copy of the request message to the respective module;
receive a server response message from the server in response to the transmission of the copy of the request message to the respective module; and
compare, for the respective module, the server response message with the constructed copy of the expected response message.

9. The computer-readable medium of claim 8, wherein the instructions for causing the processor to identify a request message further comprise instructions for causing the processor to:
retrieve from the database module names associated with the respective modules; and
retrieve from the database the one or more message lists corresponding to the modules based on the corresponding module names, the one or more message lists including a message identifier and a message name associated with each message.

10. The medium of claim 8, further comprising instructions for causing the processor to create templates for the request message and the expected response message in accordance with the definitions.

11. The medium of claim 10, wherein the definitions define a message identification field, one or more parameter name fields, and one or more parameter value fields associated with the parameter name fields.

12. The medium of claim 10, further comprising instructions for causing the processor to construct copies of the request message and the expected response message based, additionally, on the templates.

13. The medium of claim 8, wherein the parameters include a parameter name and a parameter value.

14. The medium of claim 8, where the instructions for causing the processor to compare the server response message with the constructed copy of the expected response message further comprise instructions for causing the processor to:
match parameters of the server response message and the constructed copy of the parameters of the expected response message; and
add a comparison result to a report.

* * * * *